Patented Aug. 30, 1949

2,480,296

UNITED STATES PATENT OFFICE 2,480,296

ETHYLENE POLYMER COMPOSITIONS

Robert Emmett Burk, Wilmington, Del., assignor to E. I. du Pont de Nemours & Company, Wilmington, Del., a corporation of Delaware No Drawing. Application February 18, 1947, Serial No. 729,393

5 Claims. (Cl. 260—79.5)

This invention relates to polymer compositions and, more particularly, to ethylene polymer compositions adapted to give products of improved transparency and surface characteristics.

The polymers of ethylene which are solids at normal temperatures, are disclosed and claimed in Fawcett et al. U. S. Patent 2,153,553 and are now known as polythene. These polymers are tough solids at normal temperature with a softening point from about 212° F. to 250° F., corresponding in composition substantially to $(CH_2)_x$, and show a crystalline structure by X-ray diffraction analysis. Generally, they have average molecular weights in excess of six thousand measured according to the method described in the aforementioned patent.

Halogenated polymers of ethylene are also known. Chlorinated polythene and its preparation is disclosed in Fawcett U. S. Patent 2,183,556. These chlorinated polythenes are usually prepared by chlorinating a polythene having a molecular weight substantially above two thousand and useful chlorinated polythene may have a chlorine content ranging from 4% to 80% by weight athough those having a chlorine content of 20% to 35% are more generally employed in commercial application.

Polythene and halogenated polymers have inherently outstanding properties for use in many applications such as electrical insulation, impregnation, coating and laminating, molded articles and extruded films and filaments. Particularly, in the packaging field thin transparent forms of polythene have been found very useful. Polythene films in thin sections may be obtained in a more or less transparent state by suitable control of either solution casting or melt extruding operations but these processes are tedious when applied on a commercial scale.

An object of the present invention is to provide new polythene and halogenated polythene compositions. Another object is to provide polythene and halogenated polythene compositions adapted to give products of improved transparency and surface characteristics. A further object is to provide such compositions having improved heat stability when subjected to the temperatures required in extrusion and molding. Other objects will be apparent from the description of the invention given hereinafter.

The above objects are accomplished according to the present invention by providing a composition essentially comprising polythene or a halogenated polythene and, as a modifier therefor, a condensation product of phosphorus pentasulfide and a compound from the group consisting of primary and secondary alcohols, amines, and mercaptans.

The compositions of this invention may be prepared by uniformly blending the polythene or halogenated polythene with, preferably, from 0.01% to 1.0%, by weight of the polymer used, of a modifier. The blending of the components of the composition may be conveniently carried out by mixing on a rubber mill, in a Banbury mixer, in a plasticator, or in other conventional apparatus used to compound plastics. The blending may be one either with or without a solvent, the solvent being subsequently evaporated when used. It is preferred that the mixing be carried out at a temperature slightly above the softening point of the polymer.

After the composition has been formed it may be reduced to a suitable particle size by comminution in a Ball and Jewell cutter or like apparatus and the comminuted composition may then be fed to an extruding machine for extrusion under conventional conditions at a temperature above the softening point of the polymer and, preferably, in the range of 300° F. to 500° F.

The improvement in clarity and reduction in surface imperfections is most noticeable in extruded film of thicknesses less than 0.015 inch. To obtain maximum clarity the film as it issues from the extruder head should be quenched. This may advantageously be carried out by passing the hot film, extruded at 300° F. to 500° F., directly into a non-solvent cooling liquid, such as water, maintained at 50° F. to 120° F. However, improvement in the surface smoothness and freedom from surface defects is noticeable in films of other thicknesses, monofilaments and the like extruded from the compositions of this invention as well as articles molded from such compositions.

Halogenated polythenes, particularly chlorinated polythene, modified with the condensation products herein considered likewise exhibit improved surfaces upon extrusion or molding. In addition, the halogenated polythene compositions have noticeably increased stability to thermal degradation as measured by loss of hydrogen halide and development of color.

The following examples in which all parts are by weight unless otherwise specified, more fully illustrate the nature of the invention.

EXAMPLE I

Several identical samples of polythene (each consisting of 454 parts) taken from the same batch, were rolled on a rubber mill at 235° F. and small amounts of the modifiers listed in the table were added. Each mixture was rolled for ten minutes and then removed from the rolls in the form of slabs which were reduced to small particles in a Ball and Jewell cutter. Each composition was then extruded at approximately 392° F. into films varying in thickness from 0.001 inch to 0.015 inch and quenched directly upon extrusion in a 65° F. water bath. Samples of unmodified polythene were also extruded under identical conditions in the same thicknesses to serve as controls for comparison with the modified samples.

When films of samples A through F (table) were compared with films of the same thickness of sample K (unmodified polythene), the modified films in each case exhibited a definitely smoother surface and greater transparency than the films made from sample K.

Table

| Sample | Modifier | Parts of Modifier per 454 Parts Polythene |
|---|---|---|
| A | Condensation product of n-octadecylamine with phosphorus pentasulfide. | 0.05 |
| B | ....do.... | 0.91 |
| C | ....do.... | 4.54 |
| D | Condensation product of 1-octadecanol with phosphorus pentasulfide. | 0.91 |
| E | Condensation product of 1-dodecanethiol with phosphorus pentasulfide. | 0.91 |
| F | Condensation product of 1,12-octadecanediol with phosphorus pentasulfide. | 0.91 |
| K | None | |

EXAMPLE II 1.82 parts of the condensation product of n-octadecylamine with phosphorus pentasulfide were dissolved in acetone and the resulting solution was mixed with 454 parts of chlorinated polythene (27% chlorine content). The acetone was evaporated from the composition leaving a coating of the modifier on the particles resulting. This modified polymer was molded into a disk of 2 in. diameter and 0.25 in. thickness at 135 lbs. per sq. in. steam pressure for ten minutes. The molded disc thus formed was transparent and practically colorless as compared to a molded disc made from unmodified chlorinated polythene (27% chlorine content) which turned a dirty brown under the identical molding conditions.

The modified chlorinated polythene evolved 0.4 mg. of hydrogen chloride per gram of polymer sample after heating in nitrogen for two hours at 329° F. whereas the unmodified chlorinated polythene evolved 4.0 mg. of hydrogen chloride per gram of polymer sample under the same test conditions.

It will be understood that the above examples are merely illustrative and that the invention broadly comprises new compositions of polythene and halogenated polythenes containing, as a modifier, a condensation product of phosphorus pentasulfide and a primary or secondary alcohol, amine, or mercaptan.

The modifiers useful in the present invention are those condensation products obtained by reacting phosphorus pentasulfide with primary or secondary, but not tertiary, alcohols, amines, and mercaptans. The compounds preferred are those which have a straight chain saturated aliphatic radical of ten to twenty-four carbon atoms, inclusive, since the use of these compounds has been found to give the maximum clarity with a minimum of color, and the compatibility with the polymer is better than when the compounds of the aromatic series are used in preparing the condensation products. Mixtures of two or more alcohols, amines, or mercaptans are suitable for use in this invention and the compounds may be either mono- or poly-compounds as indicated in the specific compounds disclosed in the table and hereafter. In addition to the several condensation products disclosed in the table, examples of other modifiers which are particularly suited for use in this invention, are the condensation products of phosphorus pentasulfide with one or more of the following: n-decylamine, 1-hexadecanol, 1-eicosanol, n-hexadecylamine, 1,10-decanediol, 1-eicosanethiol.

The preparation of the herein considered condensation products is known in the art. Usually it is preferred to prepare them by reacting one part of phosphorus pentasulfide with approximately four molecular equivalents of the alcohol, amine, or mercaptan either in the presence or absence of a solvent. While the precise proportions recomended are not critical, reacting the components in such proportion tends to eliminate an excess of one or the other at the end of the reaction.

The reaction whereby the condensation products are formed can be carried out in the presence of suitable solvents for the condensation products such as benzene, toluene, xylene, heptane, and commercial cuts of petroleum hydrocarbons boiling between 150° F. and 300° F. The reaction is continued until the rate of hydrogen sulfide evolution decreases appreciably or ceases completely. It is preferred that the reaction be carried out at temperature not exceeding 300° F. and, as a practical matter, a temperature of at least 150° F. will be used although there is no difference in the product formed if a lower temperature is employed, the only drawback being that the reaction tends to proceed at uneconomically slow rates. The crude condensation product which may be a solid or a liquid depending upon the specific compounds used, is recovered and purified by conventional methods.

The proportion of modifier used in the compositions of this invention is fairly critical. At least 0.01%, by weight of the polymer, should be used to gain substantial benefit from the present invention and in most cases it is preferred to use between 0.1% and 0.5%. The use of appreciably more than 1% of modifier, by weight of the polymer, is not generally advisable because there is substantially no further improvement in clarity, freedom from surface defects, and stability while there is some danger that the color of products molded or extruded from the composition might be affected.

Minor amounts of other additives may be incorporated in the modified polythene and halogenated polythene compositions of this invention provided the additional ingredients are present in amounts of less than about 15% by weight of the polymer and provided they do not impair the clarity of the resulting compositions in those instances where clarity is an essential requisite. Thus, small amounts of antioxidants may be employed in amounts varying from 0.1% to 2% by weight of the polymer in the composition; also, small amounts of dyes and lubricants may be added. Pigments and fillers can be employed but obviously would not be used in those compositions designed to give transparent products since such additives would destroy the clarity.

As many apparently widely different embodiments of this invention may be made without departing from the spirit and scope thereof, it is to be understood that the invention is not limited to the specific embodiments thereof except as defined in the appended claims.

The invention claimed is:

1. A composition comprising a polymer of the group consisting of solid polythene and halogenated solid polythene, and, as a modifier therefor, 0.01% to 1.0%, by weight of said polymer, of a condensation product of phosphorus pentasulfide and a compound of the group consisting of primary and secondary alcohols, amines, and mercaptans having a straight chain, saturated aliphatic radical of 10 to 24 carbon atoms, inclusive.

2. A composition comprising solid polythene and, as a modifier therefor, 0.01% to 1.0%, by weight of said polythene, of a condensation product of phosphorus pentasulfide and a compound of the group consisting of primary and secondary alcohols, amines, and mercaptans having a straight chain, saturated aliphatic radical of 10 to 24 carbon atoms, inclusive.

3. A composition comprising a polymer of the group consisting of solid polythene and halogenated solid polythene, and, as a modifier therefor, 0.1% to 0.5%, by weight of said polymer, of a condensation product of phosphorus pentasulfide and a compound of the group consisting of primary and secondary alcohols, amines, and mercaptans having a straight chain, saturated aliphatic radical of 10 to 24 carbon atoms, inclusive.

4. A composition comprising solid polythene and, as a modifier therefor, 0.1% to 0.5%, by weight of said polythene, of a condensation product of phosphorus pentasulfide and a compound of the group consisting of primary and secondary alcohols, amines, and mercaptans having a straight chain, saturated aliphatic radical of 10 to 24 carbon atoms, inclusive.

5. A composition comprising chlorinated solid polythene and, as a modifier therefor, 0.01% to 1.0%, by weight of said chlorinated polythene, of a condensation product of phosphorus pentasulfide and a compound of the group consisting of primary and secondary alcohols, amines, and mercaptans having a straight chain, saturated aliphatic radical of 10 to 24 carbon atoms, inclusive.

ROBERT EMMETT BURK.

REFERENCES CITED

The following references are of record in the file of this patent:

UNITED STATES PATENTS

| Number | Name | Date |
| --- | --- | --- |
| 2,121,611 | Salzberg | June 21, 1938 |
| 2,405,977 | Peters | Aug. 20, 1946 |

OTHER REFERENCES

Hahn et al.: Polythene—Physical and Chemical Properties, Ind. and Eng. Chem., June 5, 1945, page 526.